(12) United States Patent
Lewis et al.

(10) Patent No.: US 6,349,671 B1
(45) Date of Patent: Feb. 26, 2002

(54) PET FEEDING SYSTEM AND METHOD OF USING SAME

(76) Inventors: Nan R. W. Lewis, 4805 N. Park Ave., Indianapolis, IN (US) 46205; Steven Rylands Brace, 1637 Woodstock Dr., Brownsburg, IN (US) 46112

( * ) Notice: Subject to any disclaimer, the term of this patent is extended or adjusted under 35 U.S.C. 154(b) by 0 days.

(21) Appl. No.: 09/606,612

(22) Filed: Jun. 29, 2000

(51) Int. Cl.[7] ............................................. A01K 1/10
(52) U.S. Cl. ............................ 119/51.02; 119/51.12; 119/53
(58) Field of Search ................. 119/51.02, 51.01, 119/840, 51.11, 51.12, 53, 53.5, 54

(56) References Cited

U.S. PATENT DOCUMENTS

| | | | | |
|---|---|---|---|---|
| 2,528,742 A | * | 11/1950 | Coffing | 119/51.12 |
| 3,468,291 A | * | 9/1969 | Allen | 119/51.12 |
| 4,036,178 A | * | 7/1977 | Lee et al. | 119/51.12 |
| 4,248,175 A | * | 2/1981 | Navarro | 119/51.12 |
| 4,532,892 A | | 8/1985 | Kuzara | |
| 4,617,874 A | * | 10/1986 | Zammarano | 119/51.12 |
| 4,655,170 A | | 4/1987 | DaSilva | |
| 5,150,664 A | * | 9/1992 | Kirk | 119/51.12 |
| 5,309,864 A | * | 5/1994 | Harmsen et al. | 119/51.02 |
| 5,377,620 A | * | 1/1995 | Phillippi | 119/51.12 |
| 5,669,328 A | | 9/1997 | Lanfranchi | |
| 5,740,757 A | | 4/1998 | Smeester | |
| 5,826,538 A | | 10/1998 | Roybal | |
| 6,044,795 A | | 4/2000 | Matsuura et al. | |

OTHER PUBLICATIONS

Author: Doctors Foster & Smith, Title: Doctors Foster & Smith Catalog, pp. 57–59, 68, Date: 00–09,2000, Publication: Believed to be us.

Author: Care–A–Lot Pet Supply Warehouse, Title: Care–A–Lot Pet Supply Warehouse Catalog, pp. 25, 112, Date: Winter 1999, Publication: Believed to be us.

\* cited by examiner

Primary Examiner—Charles T. Jordan
Assistant Examiner—Judith A. Nelson
(74) Attorney, Agent, or Firm—Liell & McNeil

(57) ABSTRACT

Pet owners in multi-pet households often find it difficult to ensure that each of their pets eats an dequate, but not excessive, amount of food each day. In addition, in those households where less than all of the pets are on a special diet, and/or where a number of the pets are on different special diets, pet owners must often resort to monitored feedings to ensure that each pet eats only the food which is intended for that pet. Monitored feedings are not only inconvenient and time consuming, they can often lead to behavioral problems in the pet, such as anorexia and competitive eating syndrome. The present invention addresses these problems by providing a pet feeding system which allows only the intended pet to have access to food stored in the dish intended for that pet, and prevents all pets in the household from eating food which is not intended for them.

20 Claims, 11 Drawing Sheets

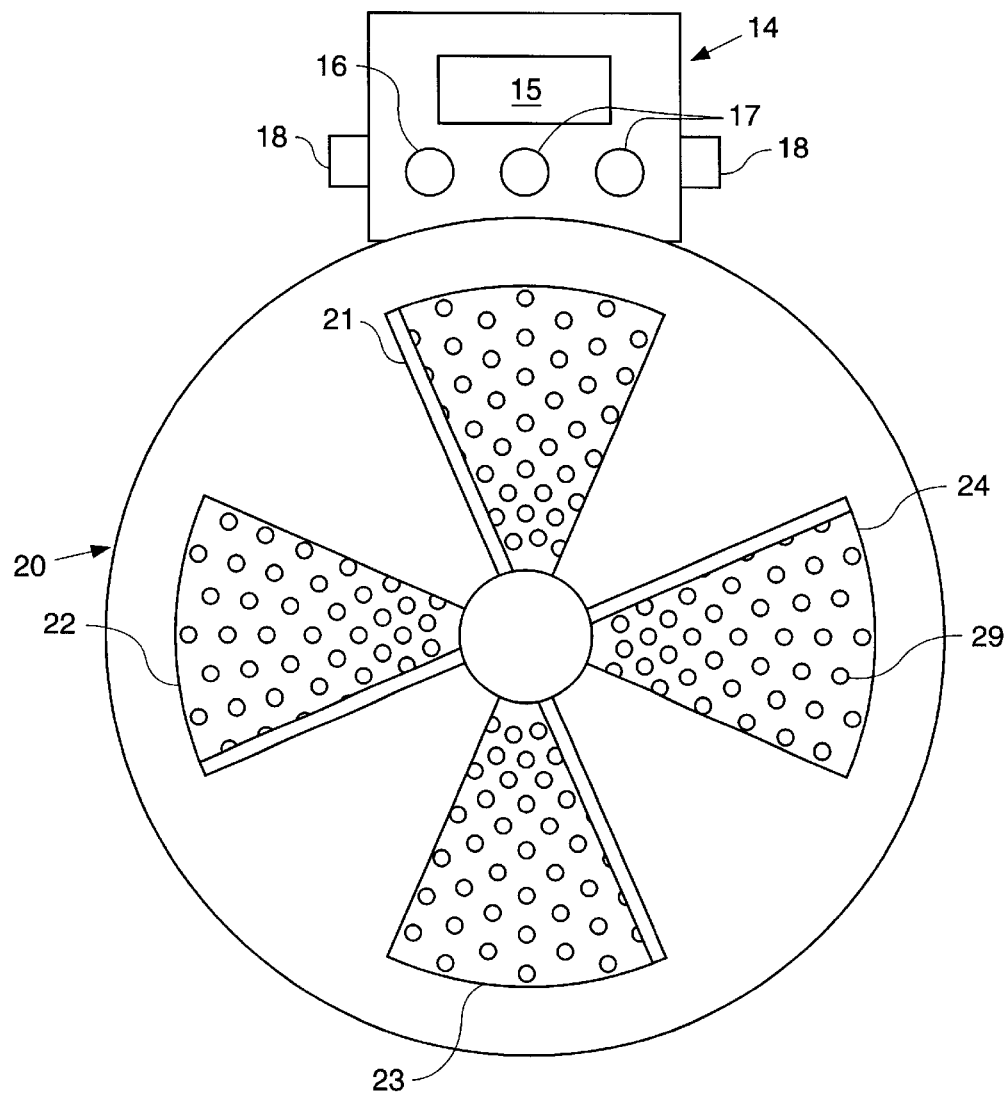

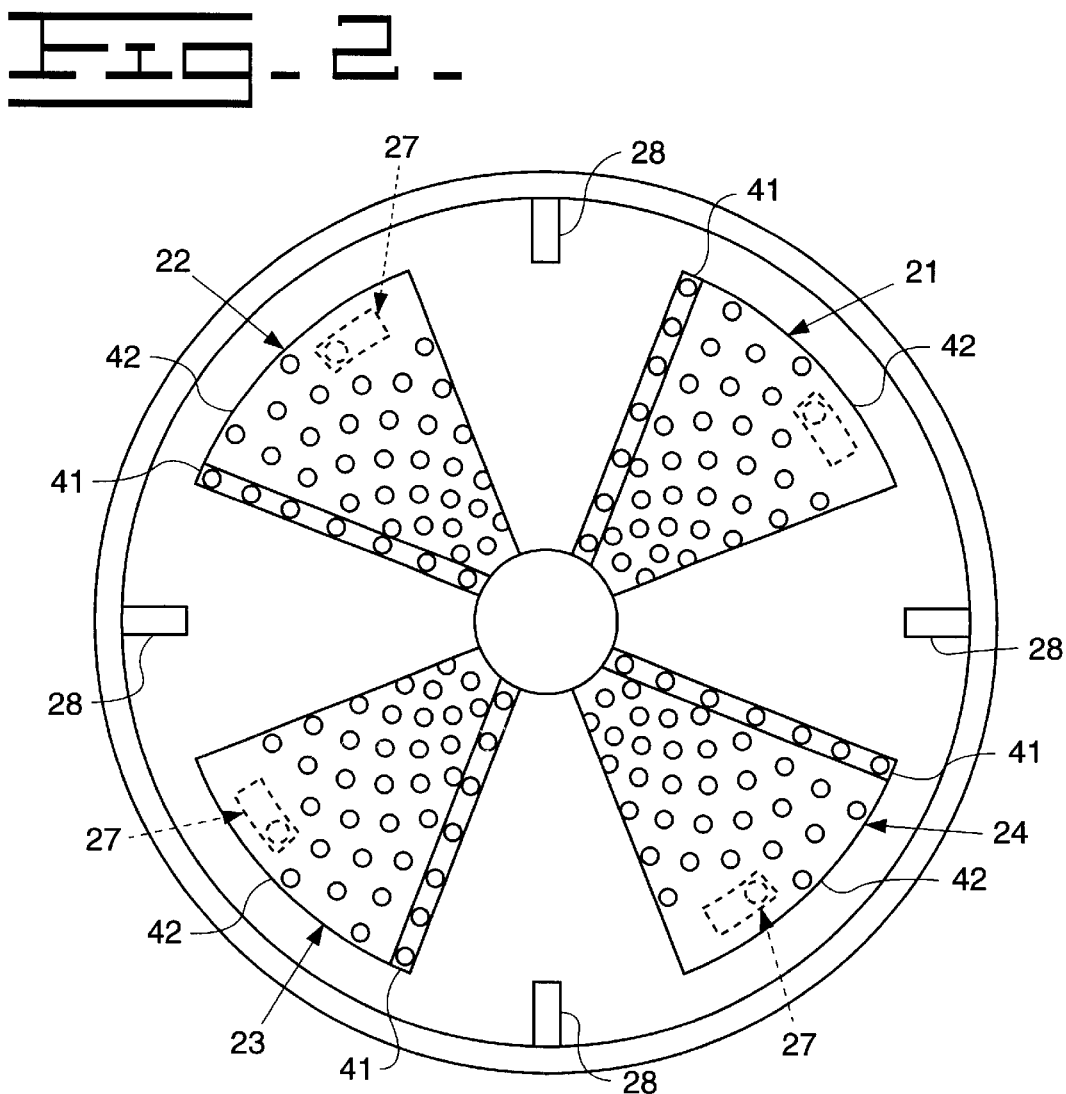
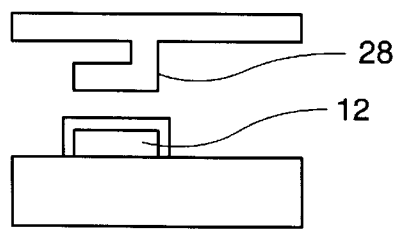

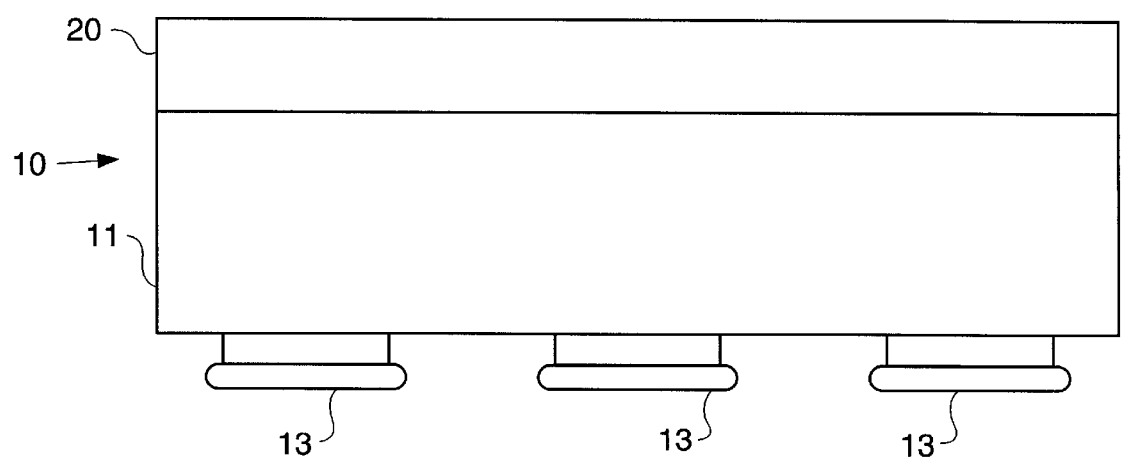
Fig_3.

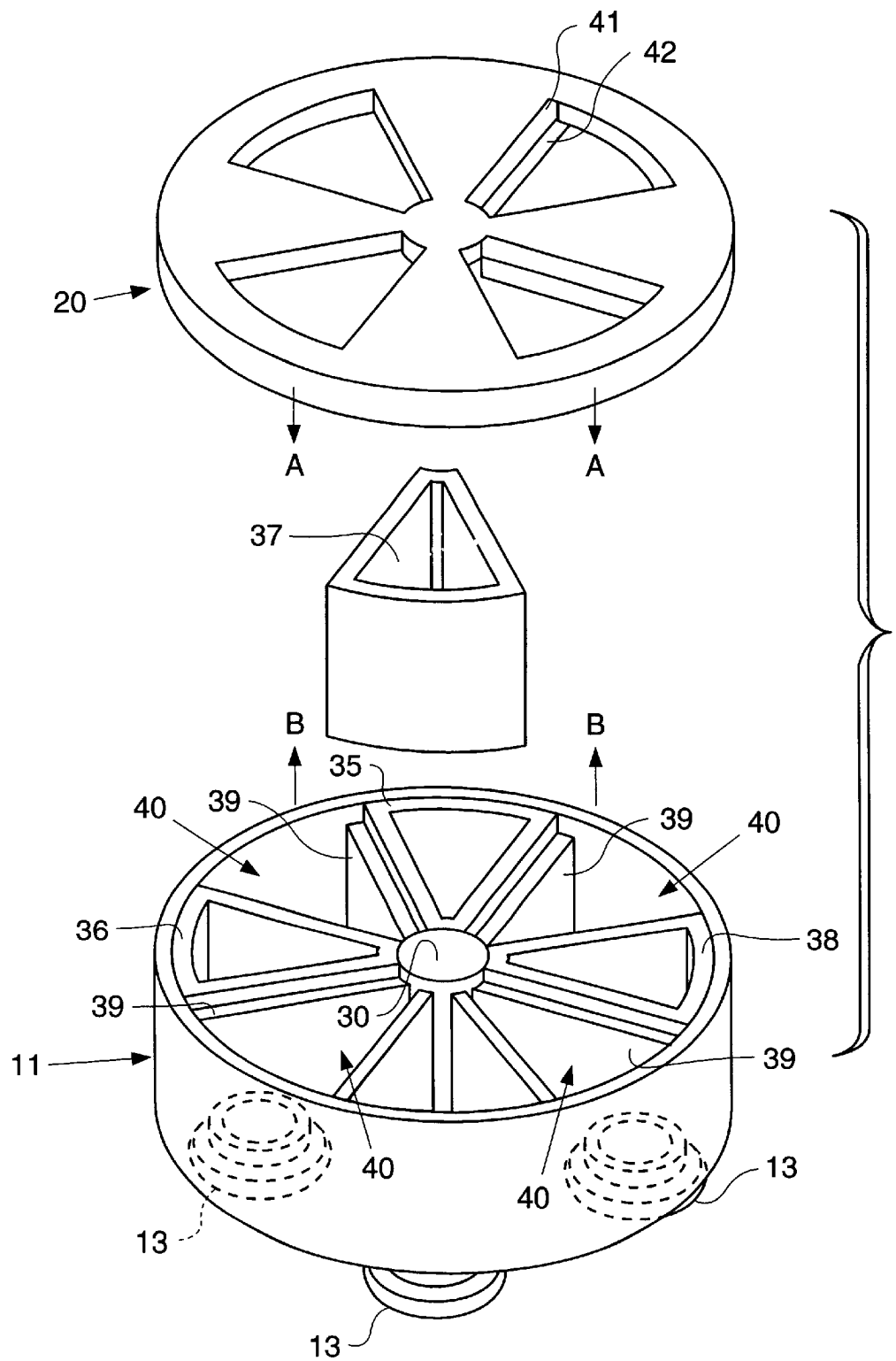

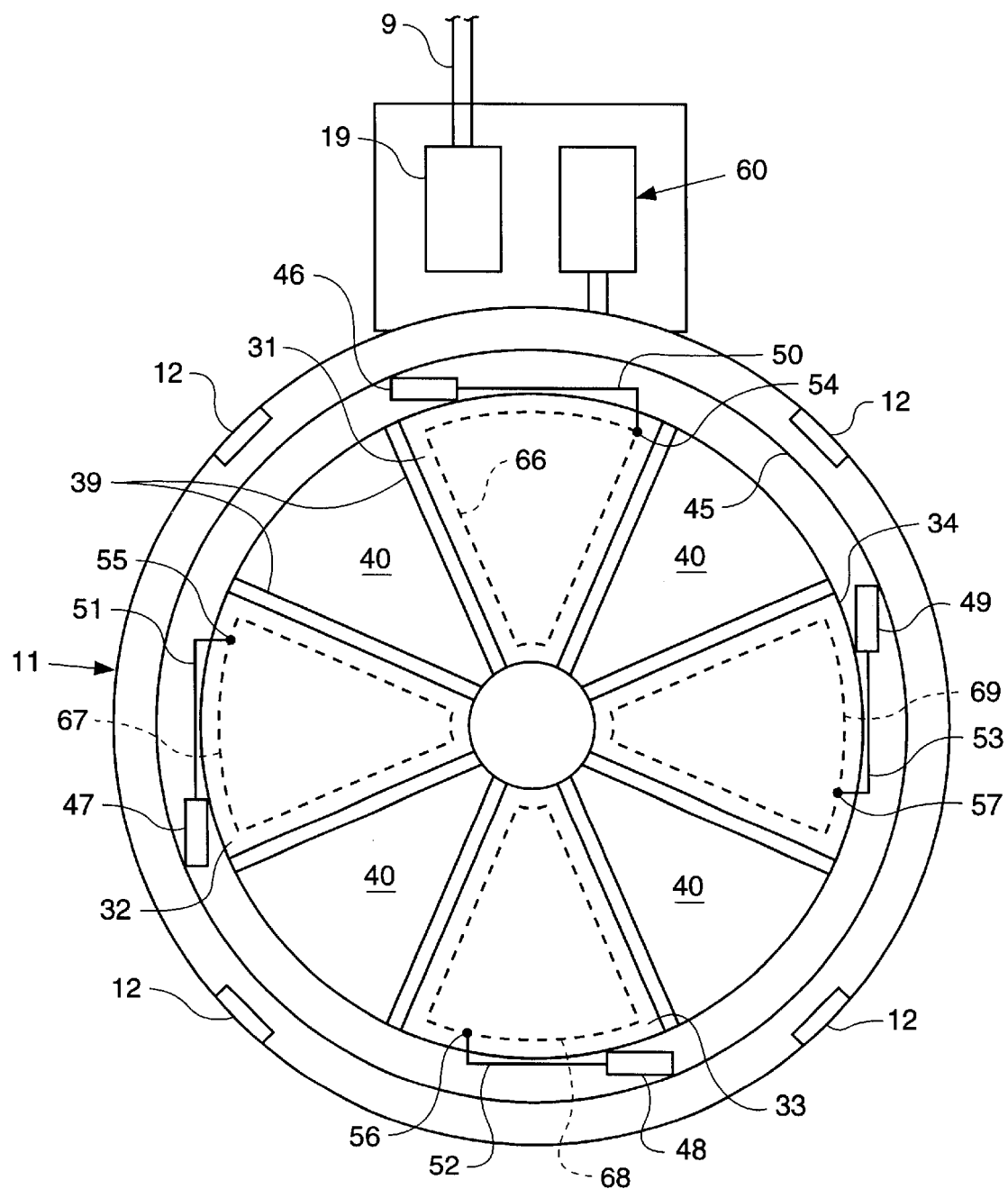

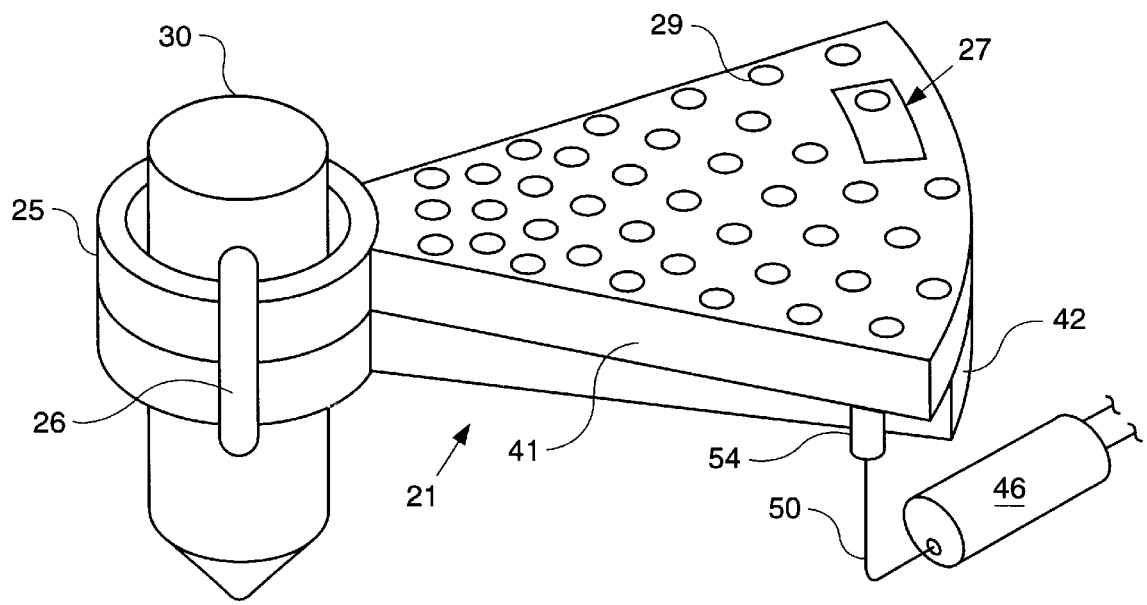
Fig_6_

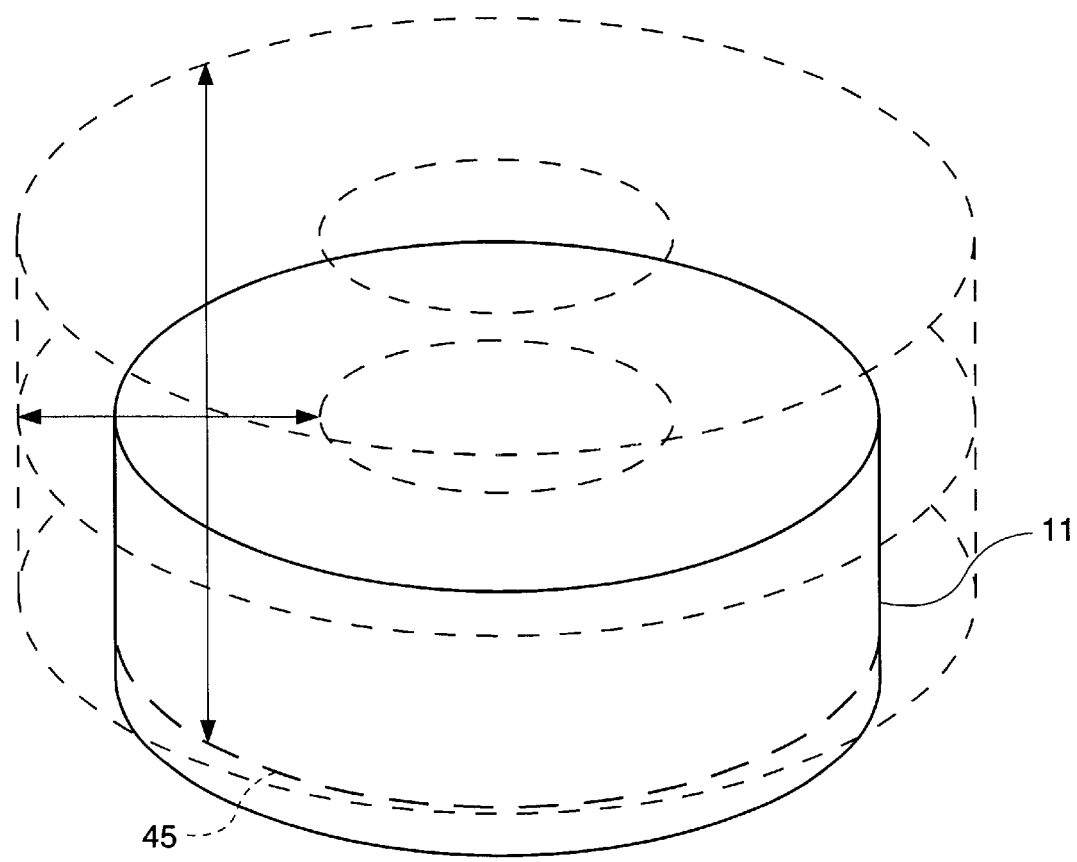

Fig. 10.
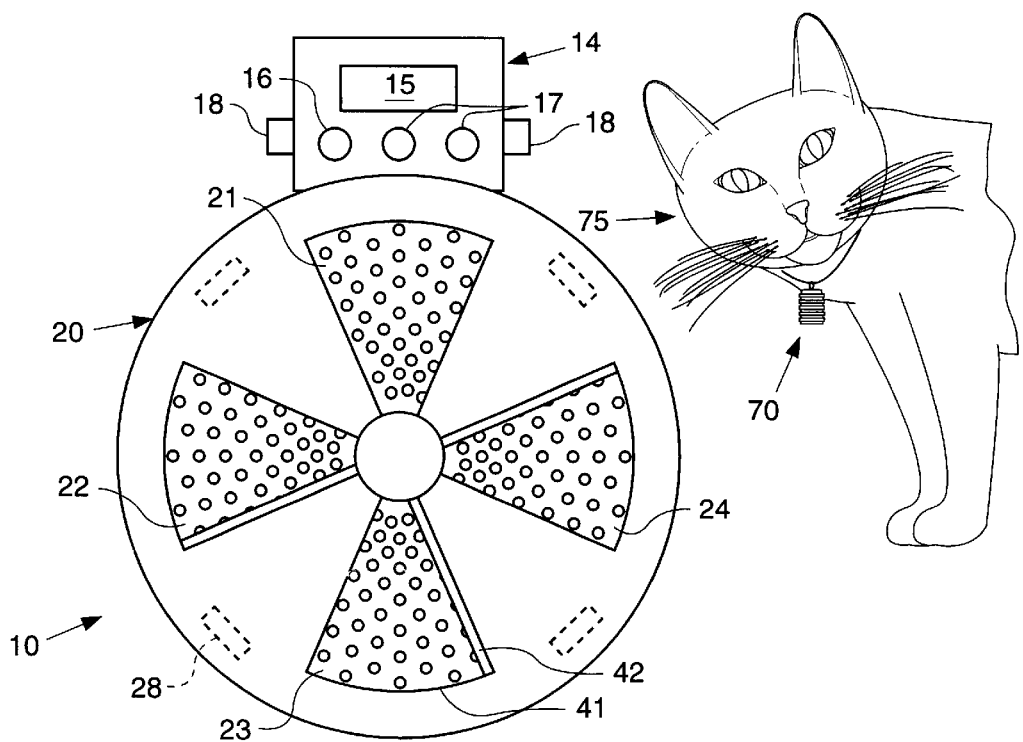
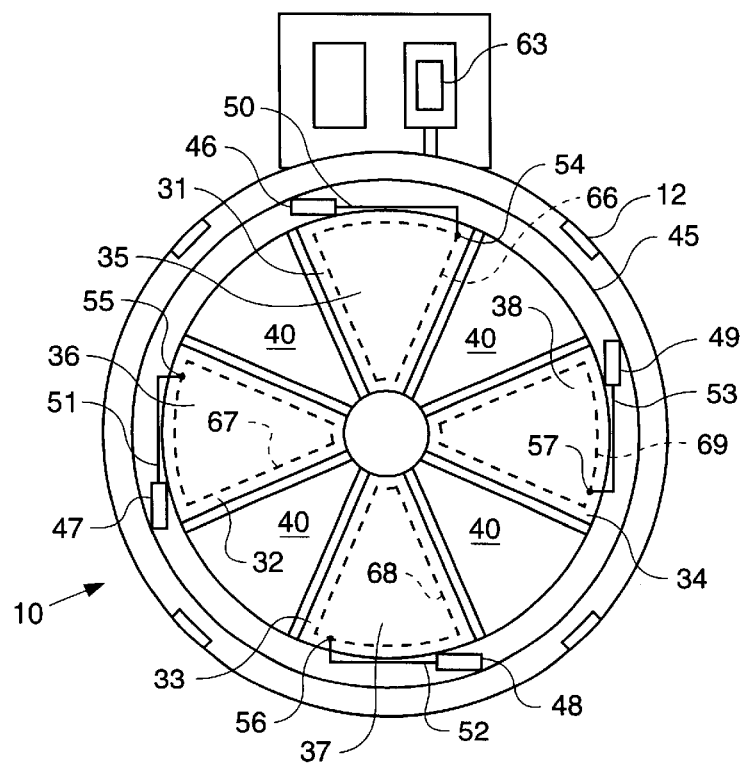

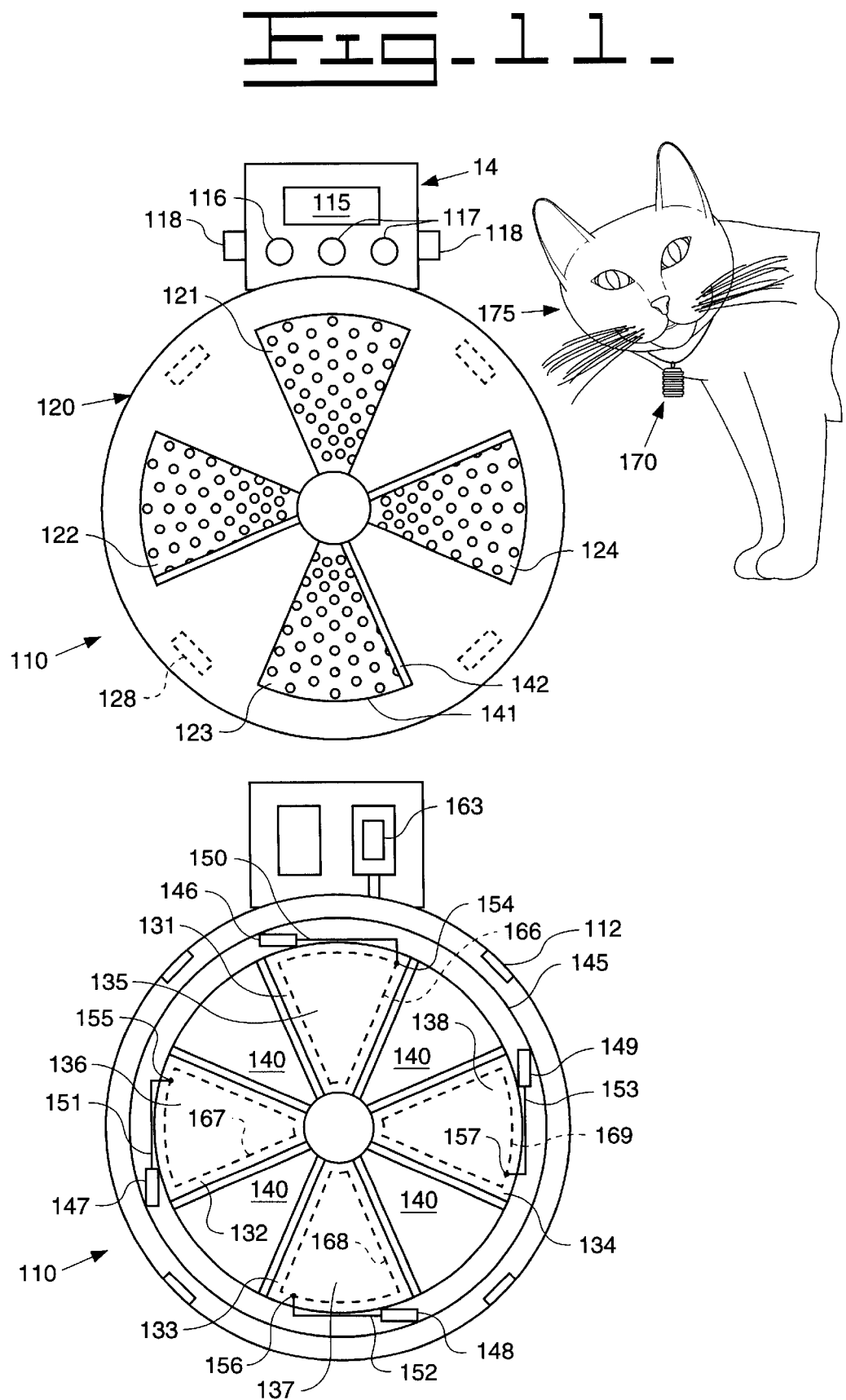

PET FEEDING SYSTEM AND METHOD OF USING SAME

TECHNICAL FIELD

This invention relates generally to pet feeding systems, and more particularly to pet feeding systems for multiple pet households; the invention allows access to food contained in a pet feeder only when a unique signal is detected by a transceiver positioned in the pet feeder.

BACKGROUND ART

Pet owners having one or more cats or dogs often find that making sure each of their animals receives a healthy amount of food every day can present a significant challenge. For instance, pet owners will often find that they have one pet who prefers to eat small, frequent meals throughout the day and another pet who will eat all of the food placed before him in one sitting. In addition, in multi-pet households, it is not uncommon for less than all of the pets to be on special diets, or for different pets to be on different special diets. To ensure that each pet eats a healthy amount of food each day, and/or only eats the correct type of food, many multiple pet owners have to monitor the feedings of their pets, which can be inconvenient and time consuming. Monitored feedings have also been found to cause behavioral problems, such as anorexia and competitive eating syndrome, in some pets. Therefore, a pet feeding system that limits each pet's access to food to a particular feeding dish would find considerable use in multi-pet homes.

The present invention is directed to overcoming one or more of the problems set forth above.

DISCLOSURE OF THE INVENTION

In one aspect of the present invention, a pet feeding system includes a feeding dish having at least one food compartment. An electrical actuator is connected to the feeding dish. A control unit which is operably coupled to a base transceiver and the electrical actuator is connected to the feeding dish. The base transceiver is also connected to the feeding dish and is operably coupled to the electrical actuator and the control unit, and is capable of receiving a unique electromagnetic signal. A transmitter is disconnected from the feeding dish. A lid containing one or more covers which are operably coupled to the electrical actuator and connected to the feeding dish is also included. The one or more covers are movable perpendicular to a vertical axis between a closed position and an open position, wherein the cover is moved toward the open position when the base transceiver receives the unique electromagnetic signal. The at least one food compartment is inaccessible when its corresponding cover is in the closed position and accessible when the cover is in the open position. A plurality of vent holes are included on each cover and are sized and arranged to prevent feeding access to the at least one food compartment, while still allowing sensory access to the compartment.

In another aspect of the present invention, a method of feeding pets includes a pet feeding system that includes a pet feeding dish having at least one food compartment, a lid (with an opening corresponding in size to the food compartment) movably attached to the pet feeding dish, a transceiver connected to the pet feeding dish and a transmitter that is disconnected from the pet feeding dish. The lid is initially positioned in a closed position in which the at least one food compartment is inaccessible because the corresponding opening is not positioned over the food compartment. The lid is moved toward an open position in which the corresponding opening is directly over the food compartment, when the transmitter is inside of a predetermined range. When the transmitter is outside of the predetermined range, the lid is moved toward the closed position.

BRIEF DESCRIPTION OF THE DRAWINGS

FIG. 1 is a top diagrammatic view of a pet feeder according to the present invention;

FIG. 2 is a diagrammatic view of the underside of the lid of the pet feeder of FIG. 1;

FIG. 2a is a diagrammatic view of the lid interlock means of the pet feeder of FIG. 1;

FIG. 3 is a side view of the pet feeder of FIG. 1;

FIG. 4 is an isometric diagrammatic view of the pet feeder of FIG. 1;

FIG. 5 is a top diagrammatic view of the interior of the base of the pet feeder of FIG. 1;

FIG. 6 is a side diagrammatic view of the pivot and cover portions of the lid of FIGS. 1 and 2;

FIG. 9 is a diagrammatic representation of the detection zone of the pet feeder of FIG. 1;

FIG. 10 is a diagrammatic view of a pet feeding system including two pet feeders, as illustrated in FIG. 1; and FIG. 11 is a diagrammatic view of the interiors of the pet feeders of FIG. 10.

BEST MODE FOR CARRYING OUT THE INVENTION

Figure 7:
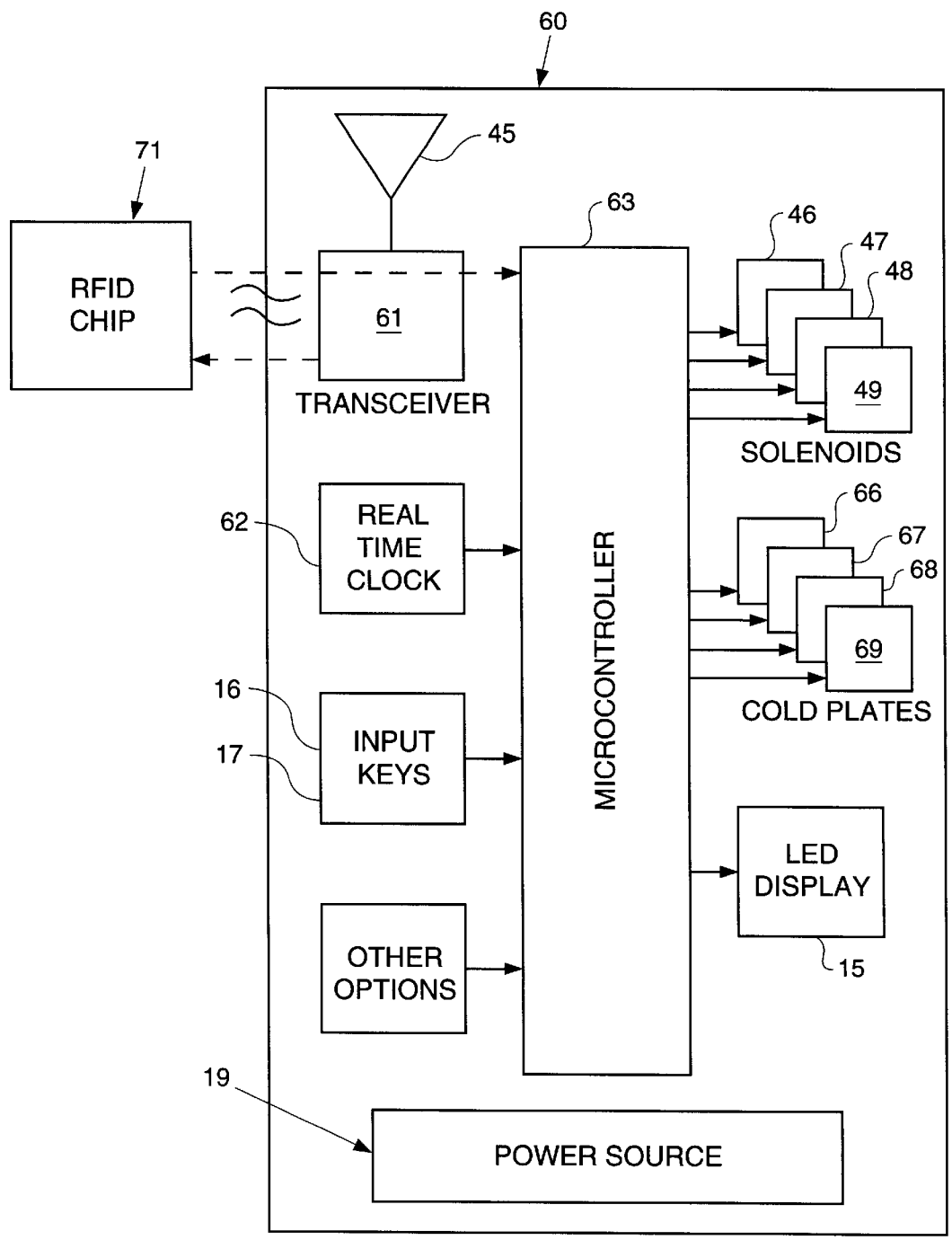
FIG. 7 is a schematic view of the control system of the pet feeder of FIG. 1.

Referring to FIGS. 1–5, a pet feeder 10 for use with a pet feeding system according to the present invention is illustrated. Pet feeder 10 includes a lid 20 that can be attached to a base 11 by matching four pegs 28 included on lid 20 with four interlock slots 12 included on base 11. This lid interlock means is best illustrated in FIG. 2a. It should, however, be appreciated that slot 12 has been shown rotated 180 degrees relative to peg 28 for illustrative purposes only. In addition, interlock markings A and B, best illustrated in FIG. 4, provide an owner with guidance when attaching lid 20 to base 11. While the illustrated method of securing lid 20 to base 11 is preferable, it should be appreciated that lid 20 could instead be attached to base 11 in any conventionally removable manner. Also preferably provided on pet feeder 10 are a plurality of suctioned feet 13 which are attached to base 11 to allow pet feeder 10 to be secured to a floor or other surface. Pet feeder 10 is preferably attached to a power source, such as a conventional home electrical outlet. Therefore, as illustrated, pet feeder 10 preferably includes a power supply 19, which could include a power cord 9 that is covered with a protective covering, such as a plastic, to prevent household pets from damaging the cord by chewing through it. However, it should be appreciated that an alternate power source, such as one or more batteries, could be used to provide the needed power to pet feeder 10.

As best illustrated in FIGS. 1 and 2, lid 20 preferably includes a first cover 21, a second cover 22, a third cover 23 and a fourth cover 24, each of which is movable to allow a pet to have access to food contained within a first food compartment 31, a second food compartment 32, a third food compartment 33 or a fourth food compartment 34, respectively. Covers 21–24 are movable between closed and open positions and are preferably sized and positioned such that food within food compartments 31–34 is inaccessible when covers 21–24 are in their closed positions. When any one of covers 21–24 is in its open position, food within the corresponding food compartment 31–34 is accessible.

Preferably, a number of removable food containers 35–38, sized to fit food compartments 31–34 are provided. These can be lifted out of base 11 for filling or washing, as best illustrated in FIG. 4. In addition, while each food compartment has been illustrated as identical in size and shape, it should be appreciated that this is not necessary. For instance, it might be preferable to have one food compartment which is much larger than the others and serves as the primary food compartment. As illustrated in FIG. 4, food compartments 31–34 are positioned in base 11 between ribs 39 which prevent the removable food containers 35–38 from moving within base 11 when pet feeder 10 is in use. Ribs 39 also allow a owner to be sure that the removable food containers 35–38 are properly reinserted into base 11 such that each is aligned with the food compartment's respective covers 21–24 to allow a pet to have access to food contained therein when the appropriate cover 21–24 is moved to its open position. When pet feeder 10 includes four food compartments 21–24, as illustrated, the food compartments are separated from one another by one or more empty compartments 40. Empty compartments 40 are preferably nothing more than open spaces between the ribs 39 which are not positioned beneath one of covers 21–24. Empty compartments 40 preferably provide additional space to allow enlargement of food compartments 31–34, as discussed above.

Base 11, food compartments 31–34, removable food containers 35–38, and lid 20 are preferably composed of, or covered with, a durable, washable material, such as a heavy-duty plastic. These components of pet feeder 10 are preferably composed of such a material, or covered with such a material, for a number of reasons. First, by using a durable plastic material, pet feeder 10 will be able to withstand a higher degree of punishment from household pets during everyday use. In addition, by constructing lid 20 and food containers 35–38 of a durable plastic, these components can be removed from pet feeder 10 and placed in a dishwasher for easy cleanup. While base 11 includes control components which will be described in greater detail later, base 11 is preferably covered with the same heavy-duty plastic that composes food containers 35–38 and lid 20 such that the control components will also receive a measure of protection from pet abuse and to allow base 11 to be easily cleaned.

Referring now in particular to FIG. 5, pet feeder 10 preferably includes a plurality of cold plates 66–69. First cold plate 66 is preferably positioned in base 11 under first food compartment 31. Similarly, one of cold plates 67–69 is preferably positioned under one of food compartments 32–34, respectively. It should be appreciated that if pet feeder 10 is programmed so that the food within first container 35 is accessible soon after filling, there is no need for a cold plate 66 under first food compartment 31, and/or for that cold plate to be activated in the case where it is included. However, in those instances when first food compartment 31 will not be accessible for an hour or more after first food container 35 is filled, cold plate 66 can be activated for a short time to keep the food in that container fresh. Cold plates 66–69 utilize electronic semiconductor cooling technology. Cold plates 66–69 receive electronic current from power supply 19 which is controlled by microcontroller 63. When cold plates 66–69 receive current, the semiconductor material provides a cooling effect. In other words, when pet feeder 10 is connected to a power source, at least one of cold plates 66–69 refrigerate the pet food contained within the respective food compartments 31–34. Cold plates 66–69 are preferably positioned in base 11 under a layer of plastic, such that they are protected when food containers 35–38 are removed from base 11. While pet feeder 10 would function adequately without cold plates 66–69, the addition of these components is preferable when a canned pet food is being used in pet feeder 10. Cold plates 66–69 can allow the moist, canned food to stay cool and fresh until it becomes accessible to a pet, and reduce the risk of bacterial spoilage.

Referring again to FIG. 1, pet feeder 10 preferably includes a control/display module 14, which is preferably attached to the outside of base 11. Control/display module 14 is preferably the means by which an owner can program pet feeder 10 to make each one of food compartments 31–34 accessible at different times throughout the day. Control/display module 14 preferably provides the owner with an LED display 15 that is connected to a real-time clock, a function button 16, and at least one timer button 17. By pushing function button 16 and at least one timer button 17 in an appropriate sequence, an owner can program pet feeder 10 to provide the pet with up to four separate meals throughout the day. In addition, function button 16 and timer buttons 17 also preferably allow an owner to program the cold plates 66–69 to be shut off at a predetermined time before their respective food compartments 31–34 become accessible. This allows food in the compartments to reach room temperature before the food in each compartment becomes accessible, thus meeting pets' general preference for room temperature food.

Also preferably included on control/display module 14 are a pair of auto open buttons 18. When auto open buttons 18 are pressed simultaneously, first cover 21, second cover 22, third cover 23 and fourth cover 24 open to allow the status of all of the food compartments under the covers to be checked without the need to remove lid 20. As illustrated in FIG. 1, auto open buttons 18 are preferably located on either side of control/display module 14 and should open covers 21–24 only when pressed simultaneously. This design is preferable to prevent pets from being able to manually open covers 21–24 on their own.

Control/display unit 14 is operably connected to a control unit 60, a schematic representation of which has been illustrated in FIG. 7. Control unit 60 includes a microcontroller 63 that is preferably a single circuit card which is capable of controlling the various functions of pet feeder 10. However, it should be appreciated that microcontroller 63 could include a plurality of different circuit cards, each capable of controlling one aspect of the function of pet feeder 10. Alternatively, microcontroller 63 could include a different control means which would be capable of controlling pet feeder 10.

Microcontroller 63 receives input from a variety of sources, including a transceiver 61. Transceiver 61 is preferably operably connected to an antenna 45 which is included in base 11 (FIG. 5) and is capable of both transmitting and receiving signals. When antenna 45 receives a signal from an outside source, this information is relayed to transceiver 61, which in turn communicates the information to microcontroller 63 for evaluation. Microcontroller 63 also receives input from a real time clock 62 that is included in control unit 60 and from input buttons 16 and 17 which are included on control/display unit 14. Microcontroller 63 evaluates information received from real time clock 62 and input buttons 16 and 17 in order to control the various time-sensitive functions of pet feeder 10. In addition to those sources of input illustrated herein, it should be appreciated that microcontroller 63 could receive input from a variety of other sources, such as an Internet appliance chip, which could be included in control unit 60 of pet feeder 10.

Once microcontroller 63 receives input from one or more of the input sources described above, the input is evaluated and microcontroller 63 can then activate or deactivate one or more of the components of pet feeder 10. For example, as illustrated in FIG. 7, microcontroller 63 is in control communication with cold plates 66–69 and a plurality of solenoids 46–49 which are included in pet feeder 10 and operably coupled to covers 21–24. When microcontroller 63 receives the appropriate information from one or more of its input sources, such as real time clock 62 or input buttons 16 and 17, microcontroller 63 can deactivate one or more of cold plates 66–69. Similarly, microcontroller 63 can also use input that it receives from transceiver 61 to activate one of solenoids 46–49 to open the appropriate cover 21–24. Microcontroller 63 can also use input received from function button 16, timer button 17 and real time clock 62 to make a particular food compartment 31–34 active. That is to say, microcontroller 63 can use input that it receives from the various input sources to prepare one of covers 21–24 to allow food contained within the respective food compartment 31–34 to become accessible.

Referring again to FIG. 5, base 11 preferably includes first solenoid 46, second solenoid 47, third solenoid 48 and fourth solenoid 49 which are operably coupled to covers 21–24, respectively. As illustrated, first solenoid 46 is coupled to a first armature 50, which inserts inside an armature contact point 54 of first cover 21. Similarly, each solenoid 47–49 is coupled to an armature 50–53 that inserts inside armature contact points 55–57 of covers 22–24. When first solenoid 46 is activated by control unit 60, it moves armature 50, which in turn pulls first cover 21 to its open position. When first solenoid 46 is deactivated, armature 50 is allowed to return to its natural position, thus returning first cover 21 to its closed position. However, while covers 21–24 are operated as described herein by solenoids 46–49 and armatures 50–53, it should be appreciated that covers 21–24 could be moved from their closed to open positions using any conventional means.

Each cover 21–24 is composed of an upper door 41 and a lower door 42, as best illustrated in FIGS. 2 and 6. Upper door 41 is preferably connected to lower door 42 by a door interlock means 27. Preferably, door interlock means 27 includes a peg that is included on lower door 42 and is movable within a slot that is defined by upper door 41. However, it should be appreciated that other interlock means could be substituted which would allow upper door 41 to move slightly with respect to lower door 42. Both upper door 41 and lower door 42 include a plurality of vent holes 29. However, when any one of covers 21–24 are not active, vent holes 29 included on upper door 41 are preferably misaligned with vent holes 29 included on lower door 42. In this manner, sensory access to food contained in the respective food compartment 31–34 will be prevented.

When a particular food compartment 31–34 becomes active, as a result of programming by the owner, that food compartment is prepared for use. For instance, when first food compartment 31 becomes the active food compartment, a signal is sent to solenoid 46 to move armature 50 to an active position. Armature 50, which is attached to upper door 41, moves upper door 41 a slight distance, limited in part by door interlock means 27. Once upper door 41 has been moved to this active position, door interlock means 27 is engaged and thereafter, the two doors move together as if they were a single door, until upper door 41 is moved to its inactive position, as explained below. When upper door 41 is moved to its active position, vent holes 29 on upper door 41 become aligned with vent holes 29 of lower door 42, allowing sensory access to food compartment 31. When solenoid 46, which is on stand-by, receives a signal from control unit 60, armature 50 is moved to an open position, opening first cover 21. When solenoid 46 is returned to stand-by, armature 50 returns to its active, closed position. This returns first cover 21 to its active, closed position in which food within first food compartment 31 is inaccessible, but vent holes 29 of upper door 41 are aligned with vent holes 29 of lower door 42.

When first food compartment 31 is no longer the active food compartment, current to solenoid 46 is ended, and armature 50 is returned to its fully closed position. Upper door 41 is then returned to its biased position, blocking sensory access to first food compartment 31. It should be appreciated that upper door 41 and lower door 42 should be sized and positioned such that food compartment 31 is inaccessible whether they are in their active or inactive closed positions; food compartment 31 is only accessible when first cover 21 is in the open position. Thus it can be seen that the respective active and inactive closed positions of upper door 41 and lower door 42 exist solely for the purpose of controlling sensory access to the food compartment. It should be further appreciated that second cover 22, third cover 23 and fourth cover 24 operate in a virtually identical manner as first cover 21, therefore, a detailed description of their operation will not be provided.

Referring again to FIG. 6, upper door 41 and lower door 42 of covers 21–24 each include a ring 25 which fits over a pivot 30 attached to the center of base 11. When lid 20 is fully assembled, rings 25 attached to each of covers 21–24 stack on pivot 30, which preferably includes two ring locks 26 to prevent rings 25 from moving vertically about pivot 30 without interfering with their ability to move horizontally about pivot 30. In this manner, each cover 21–24 is prevented from becoming misaligned by moving vertically about pivot 30, while still being capable of the desired horizontal movement. It should be appreciated that other mechanical means could be used to prevent undesired vertical movement.

Figure 8:
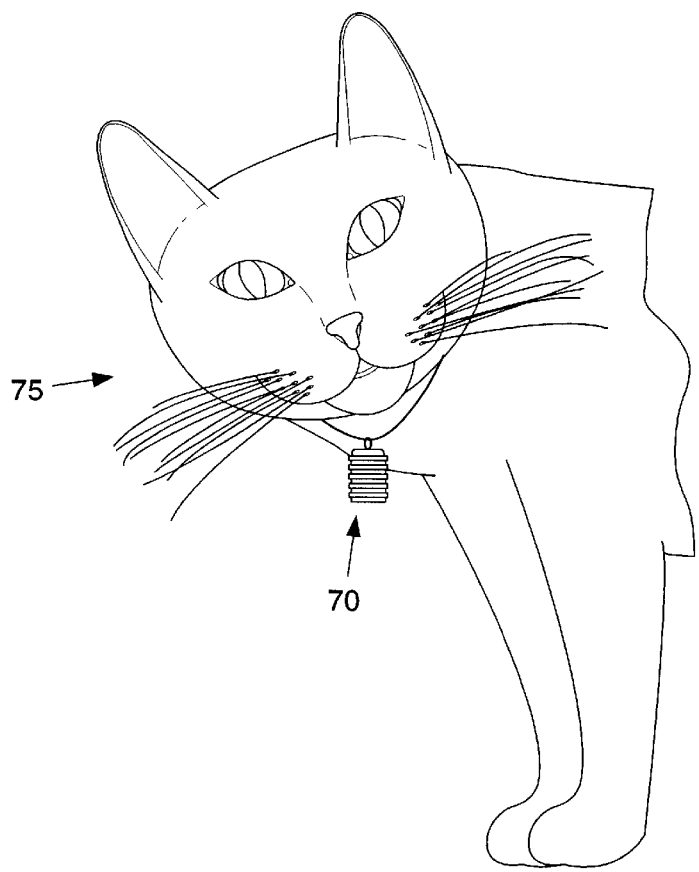
FIG. 8 is a view of one tag for use with the present invention as worn on the collar of a pet.
Figure 8A:
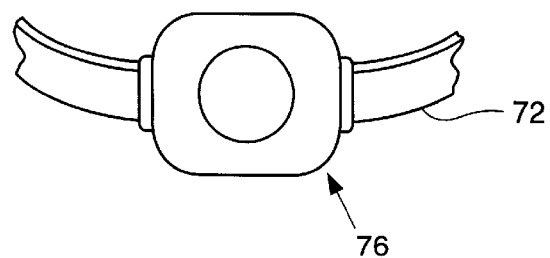
FIG. 8a is a view of an alternate tag for use with the present invention.

Referring now in addition to FIGS. 7–8, while any one of a number of different control means could be used to move covers 21–24 to their open positions, the present invention preferably utilizes a radio frequency signal which is sent to transceiver 61 via antenna 45, then on to microcontroller 63, which activates the solenoids 46–49. Preferably, the radio signal is generated from a tag 70 which can be worn on a collar 72 of a pet 75. As best illustrated in FIGS. 8–8a, tag 70 can either be a removable tag which can be attached to hang down from the collar of a pet (FIG. 8), or, alternatively, it could be a tag 76 which is attached directly to a collar (FIG. 8a).

Tag 70 and tag 76 each preferably include a passive radio frequency (RF) chip 71 which is capable of transmitting a unique RF signal in response to a triggering signal which is transmitted from transceiver 61 through antenna 45, included in base 11. It should be appreciated that radio frequency chip 71 can receive power in any conventional manner, such as through the use of a battery contained in tag 70, but in the present invention it preferably receives the small amount of power it needs to transmit its unique signal from the triggering signal generated by antenna 45. This method is preferable due to the unknown effects on pet 75 which could be caused by active power generation by tag 70, which remains on the pet's body twenty-four hours per day.

Base transceiver 61 preferably continuously sends out a triggering signal via antenna 45 while pet feeder 10 is connected to a power supply 19. However, antenna 45 and base transceiver 61 can preferably only detect a response signal from RFID chip 71 if tag 70 is within the detection range of pet feeder 10. The detection range is preferably large enough that pet 75 can activate pet feeder 10 to open one of covers 21–24 when at a reasonable distance from base 11. However, the detection range is also preferably small enough that pet feeder 10 will close any open cover 21–24 if pet 75 moves even a relatively short distance away from pet feeder 10, such as if pet 75 is nosed out of the way by another household pet who is not wearing a tag which transmits the unique signal for pet feeder 10. This detection range is preferably a doughnut shaped region surrounding pet feeder and including a portion of pet feeder 10. As illustrated in FIG. 9, the detection zone preferably extends approximately three inches radially inward and outward from antenna 45.

The detection zone preferably extends approximately four inches vertically up and down from antenna 45. Note that because antenna 45 surrounds the entire inner diameter of pet feeder 10, it will trigger RFID chip 71 to transmit its unique signal even if the pet is not standing directly in front of the food compartment 31–34 which is programmed to be active during that time. However, it is believed that because vent holes 29 are only open over a single food compartment 31–34 at a time, when the appropriate cover has been moved to the active position, pet 75 will approach pet feeder 10 nearest the active food compartment 31–34. In any case, if pet 75 approaches pet feeder 10 nearest an inactive food compartment 31–34, the inactive food compartment's cover 21–24 simply will not respond, thus providing pet 75 with negative stimulus to reposition itself with respect to pet feeder 10.

System Operation

Referring now to FIGS. 10 and 11, operation of the pet feeding system of the present invention will be described for a household having a first pet feeder 10 and a second pet feeder 110. However, it should be appreciated that second pet feeder 110 is identical in structure and function to first pet feeder 10. It should also be appreciated that while operation of the present invention is being described using two pet feeders, operation of the pet feeding system would be virtually identical when using any number of pet feeders.

First pet feeder 10 and second pet feeder 110 are prepared for use in a similar manner. The owner rotates lid 20 a few degrees counter-clockwise to release pegs 28 from interlock slots 12. Lid 20 is then removed from first pet feeder 10 and an amount of pet food is placed in food compartments 31–34 using removable food containers 35–38. Food containers 35–38 can be filled while they are positioned within food compartments 31–34, or alternatively, they can be removed from base 11, filled and then reinserted. Once food containers 35–38 are inserted into food compartments 31–34, lid 20 is reattached to base 11 by positioning lid 20 on base 11 and rotating the same a few degrees clockwise to force pegs 28 to lock with interlock slots 12. If either first pet feeder 10 or second pet feeder 110 were disconnected from their power source, such as by unplugging the unit from an outlet, the unit could be reconnected to its power supply at this time.

However, it should be appreciated that it is not necessary to disconnect either pet feeder 10 or 110 from their power sources in order to prepare them for use.

If the owner prepares only first food compartment 31 of first pet feeder 10 and first food compartment 131 of second pet feeder 110 for use, first food compartments 31, 131 will be the only food compartments which will respond when the appropriate RF signal is received by antennas 45, 145 and base transceivers 61, 161. However, the owner can choose to also fill one or more of food compartments 32–34, 132–134 and then can use control/display modules 14, 114 to ensure that each of the food compartments 31–34 and 131–134 are active and capable of opening for a specified period of the day. For instance, by pushing function buttons 16, 116 and timer buttons 17, 117 in an appropriate sequence, the owner could determine when each food compartment 31–34, 131–134 would become active throughout the day. Similarly, function buttons 16, 116 and timer buttons 17, 117 could be used to program cold plates 66–69, 166–169 to shut off at a set time prior to activation of their respective food compartments 31–34, 131–134.

For illustrative purposes, operation of the present invention will be described for the case when both first pet feeder 10 and second pet feeder 110 have been programmed to allow first covers 21, 121 to open from midnight to 6:00 a.m., second covers 22, 122 to open from 6:00 a.m. to noon, third covers 23, 123 to open from noon to 6:00 p.m. and fourth covers 24, 124 to open from 6:00 p.m. to midnight. In addition, operation will be described for the case when both first pet feeder 10 and second pet feeder 110 have been programmed for each cold plate 66, 166 of food compartments 31, 131 to be inactive, and for cold plates 67–69, 167–169 to shut off one half hour before its corresponding food compartment 32–34, 132–134 becomes active. However, it should be appreciated that the four time periods need not be equal in length and could instead be any portion of the day that the owner prefers. In addition, cold plates 66, 166 can also be activated. It should further be appreciated that each pet feeder 10, 110 could be programmed such that the four time periods for the first pet feeder 10 are not equal to the four time periods for second pet feeder 110. System operation is further described using only tags 70, 170, since tags 76, 176, although shaped differently and positioned on the pets' collars differently, work in an identical manner. Finally, it should also be appreciated that the owner need not choose between activating just first food compartment 31 or all four food compartments 31–34 of pet feeder 10. Rather, the owner can choose to activate only food compartment 31, both food compartments 31 and 32, food compartments 31–33 or all four food compartments 31–34, the same holding true for pet feeder 110 as well.

After first pet feeder 10 and second pet feeder 110 have been filled and programmed, they are ready for use by the household pets 75, 175. The remainder of the use of the pet feeding system will be described for the case where first pet 75 is wearing a first RFID tag 70 which is capable of activating only first pet feeder 10 and second pet 175 is wearing a second RFID tag 170 which is capable of activating only second pet feeder 110. However, it should be appreciated that it might be desirable to have more than one pet eat from first pet feeder 10 and one or more pets eat from second pet feeder 110. This alternative, as well as others, will be explored in greater detail following the description of use of the present invention.

When first pet 75 approaches first pet feeder 10 such that first RFID tag 70 enters the detection zone of antenna 45, RFID chip 71 receives a signal from base transceiver 61 via antenna 45 and transmits a unique RF signal in response. This unique RF signal is received by base transceiver 61 via antenna 45 and relayed to microcontroller 63. Microcontroller 63 evaluates the RF signal to confirm that it is the correct signal. If the RF signal is indeed the unique signal for pet feeder 10, microcontroller 63 determines which cover 21–24 should be opened as a result of the time periods programmed into the control/display module. If the RF signal is received during the first time period which has been programmed, microcontroller 63 activates first solenoid 46, which moves first armature 50 of first cover 21. First cover 21 is then slid into its open position about pivot 30, and first pet 75 can gain access to food within first food compartment 31.

When first pet 75 moves away from first pet feeder 10 such that first RFID tag 70 moves out of the detection zone of antenna 45, antenna 45 can no longer receive the unique RF signal from tag 70. Base transceiver 61 then relays this information to microcontroller 63, which deactivates first solenoid 46 to cause first armature 50 to close first cover 21. Food within first food compartment 31 is now inaccessible to any pet within the household except first pet 75, if first pet 75 reenters the detection zone. If first pet 75 approaches second pet feeder 110 such that first RFID tag 70 is moved within the detection zone for antenna 145, RFID chip 71 will receive the signal from base transceiver 161 via antenna 145 and transmit its unique signal. Antenna 145 will relay the signal to base transceiver 161, which will then relay this signal to microcontroller 163 or evaluation. However, because microcontroller 163 will recognize only a unique RF signal from second RFID tag 170, microcontroller 163 will not activate first solenoid 146 to open first cover 121.

At the time programmed by the owner, preferably just prior to the end of the first time period, microcontrollers 63, 163 send a signal to second cold plates 67, 167 to end cooling of food within second food compartments 22, 122. Once the first time period expires, microcontrollers 63, 163 send a signal to first door solenoids 46, 146 causing them to shift upper doors 41, 141 slightly with respect to lower doors 42, 142, thus disengaging door interlock means 27, 127. This returns first covers 21, 121 to their inactive positions by misaligning vent holes 29, 129 of upper doors 41, 141 and lower doors 42, 142.

Microcontrollers 63, 163 will then signal second solenoids 47, 147 to move second armatures 51, 151 to the active position such that upper doors 41, 141 of second covers 22, 122 are moved slightly to align their vent holes 29 with those included on lower doors 42, 142. If first pet 75 reenters the detection zone of first pet feeder 10 during this second time period, RFID tag 70 will again transmit its unique signal in response to the triggering signal sent by antenna 45, which will relay the signal back to microcontroller 63, via transceiver 61. After evaluating the unique signal, microcontroller 63 will activate second solenoid 47 to open second cover 22 to allow first pet 75 to have access to second food compartment 32.

Similarly, if second pet 175 enters the detection zone of second pet feeder 110 during the second time period, RFID tag 170 will send its unique signal to base transceiver 161 via antenna 145, and microcontroller 163 will activate second solenoid 147 to open second cover 122 upon receipt of the correct signal. Recall that while the pet feeding system of the present invention is being described including two pet feeders 10, 110 which have been programmed having time periods that are the same, this is not necessary.

Pet feeders 10, 110 each continue to allow only the pet wearing the RFID tag 70, 170 which transmits the correct unique signal to base transceivers 61, 161 via antennas 45, 145 to have access to second food compartments 22, 122 when pet 75, 175 is in the zone of detection for pet feeder 10, 110. Near the end of the second time period, microcontrollers 63, 163 will deactivate cold plates 68, 168, such that food within third food compartments 23, 123 will no longer be cooled. When the second time period ends, microcontrollers 63, 163 will deactivate second solenoids 47, 147 to move second armatures 51, 151 which move second covers 22, 122 to their inactive positions, thus closing vent holes 29, 129. Microcontrollers 63, 163 will then activate third solenoids 48, 148 to move third armatures 52, 152 to shift third covers 23, 123 to their active positions. Third covers 23, 123 can then be opened in a manner similar to that described for first covers 21, 121 and second covers 22, 122. Third covers 23, 123 are deactivated at the end of the third time period in a manner virtually identical to the deactivation of first covers 21, 121 and second covers 22, 122 described above. Similarly, fourth food compartments 34, 134 and fourth covers 24, 124 are prepared for use in a similar manner to the preparation of third food compartments 33, 133 and third covers 23, 123 described above.

At any time during the operation of first pet feeder 10 and/or second pet feeder 110, an owner can check on the status of food contained therein in one of two ways: first, by twisting lid 20, 120 a few degrees counter-clockwise to release pegs 28, 128 from interlock slots 12, 112, and removing the lid; second by depressing both auto open buttons 18, 118, positioned on control/display modules 14, 114. Recall that when both auto open buttons 18, 118 are depressed simultaneously, all four covers 21–24, 121–124 are moved to their open positions by their respective solenoids 46–49, 146–149. Further, at any time during the operation of either pet feeder 10 or 110 an owner can change the duration of the current and subsequent time periods by utilizing function buttons 16, 116 and timer buttons 17, 117 of control/display modules 14, 114.

The pet feeding system of the present invention has a number of advantages over pet feeding methods and devices of the prior art. Because a pet does not have to insert its head into an aperture on pet feeder 10 to reach food contained therein, there is less likelihood of the pet getting its head caught in the device, resulting in the pet being too afraid of the pet feeder to eat from it. This is especially important if the pet feeder is being used to feed cats, as they will typically avoid any object which has previously frightened them. In addition, because the pet feeding system of the present invention can allow an owner to make food in one pet feeder accessible to only one pet in the household, the owner will no longer have to monitor feedings to ensure that each pet gets an adequate, but not excessive, amount of food, and/or eats only the correct food if that pet is on a special diet. Further, because food contained within the pet feeder will only become available when a pet wearing an appropriate tag is in the detection zone of the pet feeder, small children within the household will be prevented from playing with, or eating, the pet's food.

While the preferred embodiment of the present invention has been illustrated herein, it should be appreciated that a number of modifications to the pet feeding system of the present invention and its method of use are contemplated. For instance, while pet feeder 10 has been illustrated including four food compartments, it should be appreciated that a different number of food compartments could instead be included. Pet feeder 10 could instead include a base that has a single food compartment and a lid that has a single cover sized and positioned to make the lone food compartment inaccessible when it is in a closed position and accessible when it is in an open position. Similarly, pet feeder 10 could include a base which has two or more food compartments and a lid which has a corresponding number of covers which function in a manner identical to covers 21–24 described herein. Further, while pet feeder 10 has been illustrated including food compartments which are relatively equal in size, it should be appreciated that this is not necessary. For instance, it might be desirable to include one relatively large food compartment which would function as the main compartment and one or more relatively small food compartments to provide smaller, supplemental meals at various points in the day.

The control unit of pet feeder 10 could also be modified to include a timed, automatic open-close feature.

Such a feature might be desirable because it is not uncommon for some pets to gulp down their food extremely rapidly so that they swallow large amounts of air, with the result that the pet vomits during or immediately after eating. This results in wasted food and a mess for the owner to clean up. Pet feeder 10 could be modified to allow the owner to engage a timed, automatic open-close feature which might function as follows. The cover of the active food compartment would allow a pet to eat for a brief period, such as ten to twenty seconds, then the cover would close for a brief period, such as thirty seconds. Thereafter, the cover would again open to allow the pet to eat for a brief period. By alternating brief periods of feeding with brief periods in which the cover was closed, pet feeder 10 would help to eliminate this problem. It should be appreciated that the duration of the feeding periods and the pauses between them could also be of greater or longer duration than the examples given here.

Additionally, while pet feeder 10 has been illustrated including food containers that are removable, it should be appreciated that pet feeder 10 could be slightly modified so that pet food could instead be placed directly into the food compartments of the base. Further, while lid 20 has been illustrated including four covers, each of which is composed of an upper door 41 and a lower door 42, it should be appreciated that this is not necessary. For instance, first cover 21 could also include only a single door which operates in a manner similar to the covers with double doors. In addition, lid 20 could include four covers which are each composed of a single door. However, it should be appreciated that in this instance, no negative stimulus would be provided for a pet to move to the active cover because vent holes 29 on each cover will still provide sensory access to any food remaining in each compartment 31–34 at all times.

Pet feeder 10 could also be modified to include lid which is attached to the base such that the entire lid rotates when antenna 45 and transceiver 61 receive the correct unique signal. For instance, the lid could include an opening equal in size to one of the food compartments contained in the base, but positioned over an empty compartment when in a closed position. Additionally, the lid could include a plurality of vent holes which would be positioned over the food compartments when the lid was in the closed position to allow a pet to have sensory access to food contained therein. Pet feeder 10 could also be modified to omit the cooling plate beneath first food compartment 31. Further, pet feeder 10 could be modified to include a different means of refrigeration than that disclosed, or no means of refrigeration at all. One alternate means of refrigeration could include a removable food container which was also a self-contained ice pack which could be frozen in the freezer and then placed in the base inside one or more of the food compartments.

In addition to these modifications, pet feeder 10 could be modified for battery operation rather than, or in addition to, receiving power from a household outlet, as described herein. A low battery indicator could be included in this modification to allow an owner to more easily assess if batteries needed replacing when they are being relied upon as the sole source of power. Pet feeder 10 could also be modified to include an auto-empty indicator, such as a light, which would allow an owner to see if most or all of the food within a food compartment had been consumed without the need for removing or opening the lid. Such an auto-empty indicator might be triggered by diminishment of the weight of the food in a given food container below a certain level, for example, although any alternative method of operation could also be utilized. Another modification to pet feeder 10 could include a voice recording chip positioned in pet feeder 10 which would allow the owner to program a short audio recording to attract the pets to the pet feeder when each new time period begins. In addition, an Internet appliance chip could be included which would allow the owner to connect the pet feeder to the Internet via a telephone line. The Internet appliance chip would allow the owner to monitor the status of pet feeder 10 when away or to reprogram the feeder from a remote location. It could also be used by the manufacturer to assist the owner with troubleshooting, and/or to download new or additional programming features via the Internet.

While the present invention has been illustrated for use in a multi-pet household where each pet wears an RFID tag which transmits a unique radio signal which activates only one pet feeder, it should be appreciated that the pet feeding system could be used in an alternate manner. For instance, the present invention could be used to allow all household pets on a special diet to eat from a first pet feeder and those household pets not on the special diet, or on a different special diet, to eat from a second pet feeder. Therefore, in a household having two pets on a special diet and one pet on a regular diet, the pet on the regular diet could wear an RFID tag which activates only a first pet feeder. The two pets on the special diet could each wear an RFID tag which emits the same unique signal to activate a second pet feeder. Similarly, in a household having both cats and dogs, it might be desirable to have all of the cats eat from one or more cat feeders and all of the dogs eat from one or more dog feeders. However, it should be appreciated that in any instance where more than one pet has access to the same feeder, the pet feeding system would only be able to prevent a dog from eating cat food, or a cat from eating dog food, but would not allow an owner to ensure that each cat or each dog was receiving the desired amount of food at each serving. Nevertheless, this application might be desirable in the instance where two or more pets were on different diets but obesity was not an issue, so that the owner would need to control only the type of food consumed, and not the amount. The owner could simply fill each pet feeder with an amount of food adequate to feed all pets using that pet feeder. Finally, while the present invention has been illustrated using radio frequency signals to control access to food contained within pet feeder 10, it should be appreciated that other control means, such as infrared activation, could be substituted, so long as such means did not have a harmful effect upon the pets using it.

Thus, those skilled in the art will appreciate that other aspects, objects and advantages of this invention can be obtained from a study of the drawings, the disclosure and the appended claims.

What is claimed is:

1. A pet feeding system comprising:
   a feeding dish including at least one food compartment;

an electrical actuator being connected to said feeding dish;

a control unit being connected to said feeding dish and being operably coupled to a base receiver and said electrical actuator;

said base receiver being connected to said feeding dish and being operably coupled to said control unit and said electrical actuator and being capable of receiving a unique electromagnetic signal;

a transmitter disconnected from said feeding dish;

a lid being operably coupled to said electrical actuator and connected to said feeding dish;

said lid being movable perpendicular to a vertical axis between a closed position and an open position, said lid being moved toward said open position when said base receiver receives said unique electromagnetic signal;

said at least one food compartment being inaccessible when said lid is in said closed position;

said at least one food compartment being accessible when said lid is in said open position; and a plurality of vent holes being included on said lid and being sized and arranged to prevent access to said at least one food compartment.

2. The pet feeding system of claim 1 wherein said at least one food compartment includes a first food compartment and a second food compartment and said lid includes a first cover and a second cover;

said first cover is movable from a closed position to an open position in which said first food compartment is accessible and said second food compartment is inaccessible; and said second cover is movable from a closed position to an open position in which said second food compartment is accessible and said first food compartment is inaccessible.

3. The pet feeding system of claim 2 wherein said transmitter is attached to a pet collar.

4. The pet feeding system of claim 3 wherein said transmitter is a tag transmitter attached to a pet collar;

a tag receiver is attached to said pet collar; and said tag transmitter is capable of transmitting said unique electromagnetic signal in response to a triggering signal originating from a base transmitter connected to said feeding dish and received by said tag receiver.

5. The pet feeding system of claim 4 wherein said second cover includes a plurality of vent holes and is movable between said closed position, a stand-by position; and said vent holes allowing sensory access to said second food compartment when said second cover is in said stand-by position and being blocked to prevent sensory access to said second food compartment when said second cover is in said closed position.

6. The pet feeding system of claim 5 wherein said unique electromagnetic signal is a radio signal.

7. The pet feeding system of claim 6 wherein said control unit includes a means for evaluating said signal and a means for activating said electrical actuator.

8. The pet feeding system of claim 7 wherein said control unit moves said first cover to said open position if said unique electromagnetic signal is received in a first portion of a predetermined time period;

said control unit moves said second cover to said open position if said unique electromagnetic signal is received in a second portion of said predetermined time period; and including a means for adjusting said first portion and said second portion of said predetermined time period.

9. The pet feeding system of claim 8 including a means for cooling said first food compartment and said second food compartment.

10. The pet feeding system of claim 9 wherein said second cover includes a first door operably connected to a second door;

said first door is movable with respect to said second door; and said second food compartment is accessible when both said first door and said second door are in an open position.

11. A multiple pet feeding system comprising:

at least one pet feeder including a feeding dish having at least a first food compartment and a second food compartment;

an electrical actuator being connected to said feeding dish;

a control unit being connected to said feeding dish and being operably coupled to a base receiver and said electrical actuator;

said base receiver being connected to said feeding dish and being operably coupled to said control unit and said electrical actuator and being capable of receiving a unique electromagnetic signal;

at least a first transmitter being disconnected from said at least one pet feeder and being capable of transmitting a first unique electromagnetic signal;

at least a second transmitter being disconnected from said at least one pet feeder and being capable of transmitting a second unique electromagnetic signal;

a lid being operably coupled to said electrical actuator and connected to said at least one pet feeder;

said lid being movable perpendicular to a vertical axis between a closed position, a first open position and a second open position, said lid being moved toward one of said first open position and said second open position when said base receiver receives at least one of said first unique electromagnetic signal and said second unique electromagnetic signal.

12. The pet feeding system of claim 11 wherein said at least one pet feeder includes a first pet feeder having a first lid and a first base receiver and a second pet feeder having a second lid and a second base receiver;

said first lid is movable toward one of said first open position and said second open position when said first base receiver receives said first unique electromagnetic signal; and said second lid is movable toward one of said first open position and said second open position when said second base receiver receives said second unique electromagnetic signal.

13. The pet feeding system of claim 12 wherein said first pet feeder includes a first feeding dish having at least a first food compartment and a second food compartment and said first lid includes at least a first cover and a second cover;

said second pet feeder includes a second feeding dish having a third food compartment and a fourth food compartment and said second lid includes a third cover and a fourth cover;

said first cover is movable from a closed position to an open position in which said first food compartment is accessible and said second food compartment is inaccessible;

said second cover is movable from a closed position to an open position in which said second food compartment is accessible and said first food compartment is inaccessible;

said third cover is movable from a closed position to an open position in which said third food compartment is accessible and said fourth food compartment is inaccessible; and said fourth cover is movable from a closed position to an open position in which said fourth food compartment is accessible and said third food compartment is inaccessible.

14. The pet feeding system of claim 13 wherein said transmitter is a tag transmitter attached to a pet collar;

a tag receiver is attached to said pet collar; and said tag transmitter is capable of transmitting said unique electromagnetic signal in response to a triggering signal originating from a base transmitter connected to said feeding dish and received by said tag receiver.

15. The pet feeding system of claim 14 wherein said first pet feeder includes a first receiver and said second pet feeder includes a second receiver;

wherein said first feeding dish is inaccessible when said first receiver receives said second unique electromagnetic signal and is accessible when said first receiver receives said first unique electromagnetic signal; and said second feeding dish is inaccessible when said second receiver receives said first unique electromagnetic signal and is accessible when said second receiver receives said second unique electromagnetic signal.

16. The pet feeding system of claim 14 wherein said first pet feeder includes a first control unit and said second pet feeder includes a second control unit;

said first control unit moves said first cover to said open position if said first unique electromagnetic signal is received in a first portion of a first predetermined time period;

said first control unit moves said second cover to said open position if said first unique electromagnetic signal is received in a second portion of said first predetermined time period;

said second control unit moves said third cover to said open position if said second unique electromagnetic signal is received in a first portion of a second predetermined time period;

said second control unit moves said fourth cover to said open position if said second unique electromagnetic signal is received in a second portion of a second predetermined time period;

said first pet feeder including a means for adjusting said first portion and said second portion of said first predetermined time period; and said second pet feeder including a means for adjusting said first portion and said second portion of said second predetermined time period.

17. A method of feeding pets comprising:

providing a pet feeding system including a pet feeding dish having at least one food compartment, a lid movably attached to said pet feeding dish, a receiver connected to said pet feeding dish and a transmitter disconnected from said pet feeding dish;

positioning said lid in a closed position in which said at least one food compartment is inaccessible;

moving said lid toward an open position when said transmitter is in a predetermined range; and moving said lid toward said closed position when said transmitter is outside of said predetermined range.

18. The method of claim 17 wherein said at least one food compartment includes a first food compartment and a second food compartment; and said step of moving said lid toward an open position includes moving said lid toward a first open position in which said first food compartment is accessible if said transmitter is in said predetermined range during a first predetermined time period; and said step of moving said lid toward an open position includes moving said lid toward a second open position in which said second food compartment is accessible if said transmitter is in said predetermined range during a second predetermined time period.

19. The method of claim 18 including preventing access to said second food compartment when said lid is in said first open position; and preventing access to said first food compartment when said lid is in said second open position.

20. The method of claim 19 wherein said transmitter is included on a tag that is attached to a pet, said tag including a tag receiver; and including a step of receiving said unique electromagnetic signal when said tag is in a predetermined reception range of said receiver.

* * * * *